M. C. WHITAKER.
PROCESS OF OBTAINING POTASSIUM COMPOUNDS.
APPLICATION FILED DEC. 31, 1917.
1,400,192.
Patented Dec. 13, 1921.
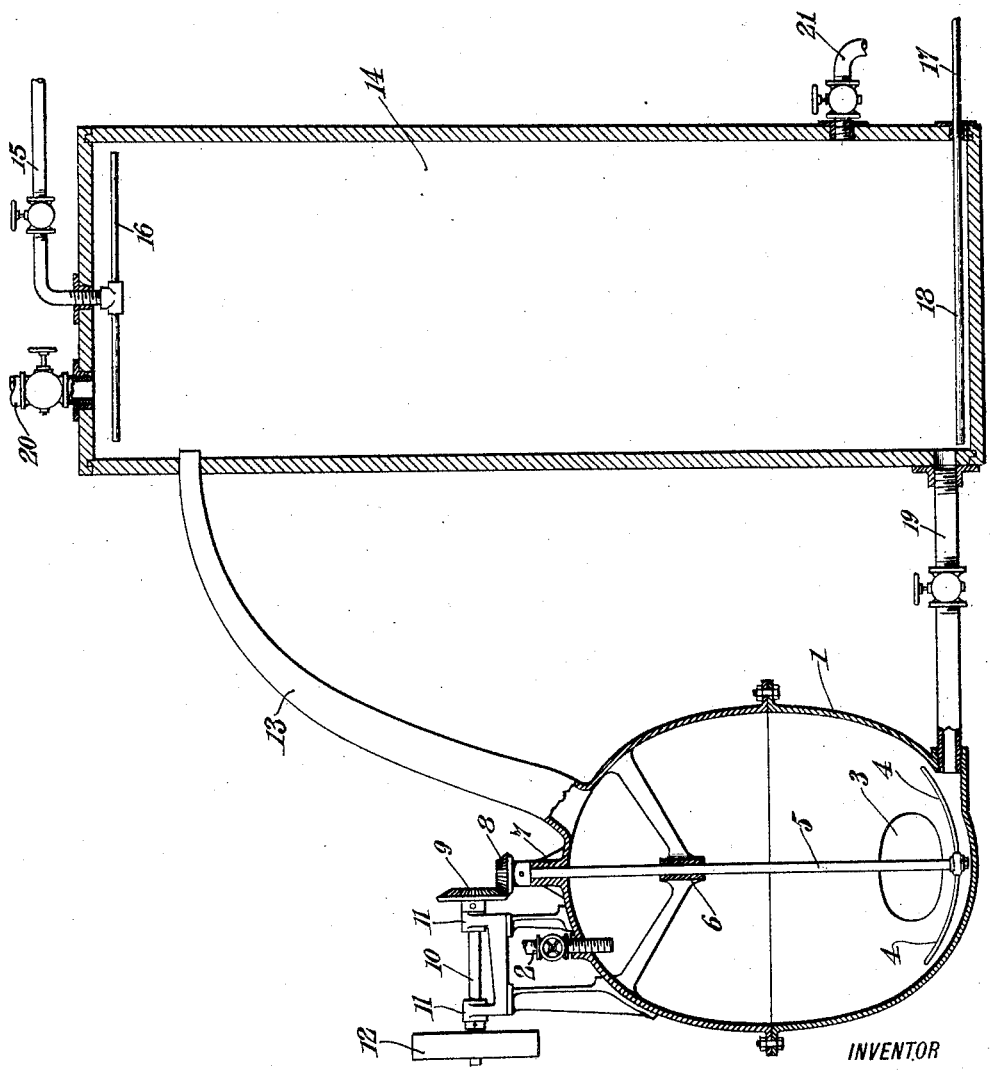

UNITED STATES PATENT OFFICE.

MILTON C. WHITAKER, OF NEW YORK, N. Y., ASSIGNOR TO U. S. INDUSTRIAL ALCOHOL CO., A CORPORATION OF WEST VIRGINIA.

PROCESS OF OBTAINING POTASSIUM COMPOUNDS.

1,400,192.  Specification of Letters Patent.  Patented Dec. 13, 1921.

Application filed December 31, 1917. Serial No. 209,606.

*To all whom it may concern:*

Be it known that I, MILTON C. WHITAKER, of New York city, in the county of New York and in the State of New York, have invented a certain new and useful Improvement in Processes of Obtaining Potassium Compounds, and do hereby declare that the following is a full, clear, and exact description thereof.

My invention relates particularly to a process of recovering potassium compounds from waste materials, but it has application especially to recovery of potassium compounds from distillery waste or slop obtained in the production of alcohol.

The object of my invention is to recover potassium compounds from such materials so that the potassium compounds may be available for use in any desired way.

A further object of my invention is to provide a process of this character which is simple and inexpensive and which may, furthermore, be carried on almost continuously without loss of any considerable percentage of the reagent used.

A further object is so to arrange the process that it may be carried out with a minimum number of steps.

Further objects of my invention will appear from the detailed description thereof contained hereinafter.

While my invention is capable of embodiment in many different forms, I shall describe only one form of my invention hereinafter; and, while it is capable of being carried out in connection with many different types of apparatus, I shall describe only one form of apparatus for the same in the accompanying drawings, in which—

The figure is a diagrammatic representation of an apparatus which may be used in connection with my invention.

In the drawings, I have shown a still 1, adapted to be heated in any suitable way, having a valved inlet pipe 2 for sulfuric acid and a man-hole 3 for the removal of the precipitated potassium compound. The still has an agitator comprised of a plurality of rotary arms 4 on a shaft 5 supported in bearings 6 and 7. The shaft 5 is driven by means of a bevel gear 8 thereon, meshing with a bevel gear 9 on a shaft 10 supported in bearings 11 and driven by a pulley 12. The still 1 is connected by a vapor outlet pipe 13 to a tower 14, which may be of wood, having at its upper portion a valved inlet pipe 15, connected to an annular perforated sprayer 16, arranged to discharge a spray of the distillery waste or slop downwardly therein. At the bottom of the tower 14 there is an inlet pipe 17 for compressed air, connected to an annular perforated pipe 18 to inject the compressed air into the body of liquid contained in the tower 14 and thus keep the same agitated while the process is being carried out. At the bottom of the tower 14 there is a valved draw-off pipe 19 for conducting the sludge from the same into the still 1, and in the top of the tower 14 there is a valved inlet pipe 20 for introducing an additional quantity of the hydrofluosilicic acid, hereinafter referred to, in order to maintain a given quantity of the same present in the process. At a point some distance above the bottom of the tower 14 there is a valved draw-off pipe 21 for the supernatant liquid.

In carrying out my process, a quantity of the distillery waste or slop, such for example as that obtained from the distillation of alcohol involving the fermentation of molasses, is introduced into the wooden tower 14 through the pipe 15. This, for example, distillery waste or slop may or may not have been previously concentrated. Thereupon a quantity of hydrofluosilicic acid ($H_2SiF_6$) is introduced into the tower 14 through the pipe 20, in the proportion of six parts by weight of the commercial hydrofluosilicic acid, containing 30% of $H_2SiF_6$, to one part by weight of the potassium oxid ($K_2O$) contained in the distillery waste or slop. Meanwhile, agitation of the contents of the tower 14 may if desired be effectively secured by the introduction of compressed air through the perforated pipe 18. This will be a sufficient quantity of the hydrofluosilicic acid to provide a slight excess of the same over what is needed to combine with the potassium contained in the liquid. As a result, the potassium salt of the hydrofluosilicic acid is precipitated and settles to the bottom of the tower 14 as a sludge. The supernatant liquid, which comprises the distillery waste or slop freed from potassium compounds, is drawn off by a pipe 21. The precipitated sludge is drawn off from the bottom of the tower 14 by means of the pipe 19, and is thus conveyed into the still 1. To the sludge thus introduced into the still 1 there is added one part by weight of sulfuric acid having a strength of 66° Bé. to ten parts by weight of the sludge. Upon heat being applied, silicon fluorid is distilled off and passes over through the vapor outlet pipe 13 into contact with the spray of distillery waste or slop being introduced into the tower 14 by the pipe 15. In this way the vapors of the silicon fluorid are absorbed and changed to hydrofluosilicic acid in the distillery waste or slop, so that the potassium therein is combined in such manner that it is precipitated, as previously pointed out. Enough additional hydrofluosilicic acid is being continually introduced into the tower 14 through the pipe 20 to maintain a given quantity of the same present while the process is being carried out. Ordinarily, enough additional hydrofluosilicic acid of 30% strength is added through the pipe 20 to amount to approximately 35% of the original quantity added in the treatment of a given quantity of the distillery waste or slop. From time to time, as the deposit or precipitate in the still 1 accumulates, this deposit or precipitate, which comprises crude potassium sulfate is removed from the still 1, and may be refined in any suitable manner, as for example, by leeching with hot water, filtration and crystallization, in order to separate the potassium sulfate from the remainder of the substances present in the deposit or precipitate.

In this way the process may be carried out almost continuously, while, at the same time, the apparatus used is simple, the steps involved are few in number, and the reagent used is continually recovered, as far as possible, while the escape of any injurious vapors is prevented.

By the expression "dilute acid" in the claims is meant an acid such as sulfuric which is sufficiently dilute to prevent the formation of hydrofluoric acid when mixed with a potassium salt or fluosilicic acid; in other words, it is desired to have a liquid sufficiently dilute to insure the formation of silicon fluorid $SiFl_4$ so that this will distil over and in the presence of water will reform the fluosilicic acid $H_2SiF_6$.

While I have described my invention above in detail, I wish it to be understood that many changes may be made therein without departing from the spirit thereof.

I claim:

1. The process which comprises precipitating potassium compounds from a material containing the same by the introduction of hydrofluosilicic acid and then recovering the hydrofluosilicic acid from the potassium salt thereof by the addition of an acid, distillation and absorption of the evolved gas in a quantity of the potassium containing material.

2. The process which comprises precipitating potassium compounds from a material containing the same by the introduction of hydrofluosilicic acid and then recovering the hydrofluosilicic acid from the potassium salt thereof by the addition of an acid, distillation and absorption of the evolved gas in a spray of the potassium containing material.

3. The process which comprises precipitating potassium compounds from a material containing the same by the introduction of hydrofluosilicic acid, then recovering the hydrofluosilicic acid from the potassium salt thereof by the addition of an acid, distillation and absorption of the evolved gas in a quantity of the potassium containing material, thus precipitating the potassium salt of the hydrofluosilicic acid, and then recovering the hydrofluosilicic acid from the precipitate in the same manner.

4. The process which comprises precipitating potassium compounds from a material containing the same by the introduction of hydrofluosilicic acid, then liberating for reuse the active constituents of said potassium compounds by the addition of an acid, distillation and absorption of the same in a spray of the potassium containing material, thus repeatedly precipitating the potassium salt of the hydrofluosilicic acid, and then recovering its active constituents from the precipitate in the same manner.

5. The process which comprises precipitating potassium compounds from a material containing the same by the introduction of hydrofluosilicic acid, then recovering the hydrofluosilicic acid from the potassium salt thereof by the addition of an acid, distillation and absorption of the evolved gas in a quantity of the potassium containing material, thus precipitating the potassium salt of the hydrofluosilicic acid, introducing sufficient additional hydrofluosilicic acid to compensate for loss thereof in the process, and then recovering the hydrofluosilicic acid from the precipitate in the same manner.

6. The process which comprises precipitating potassium compound from a material containing the same by the introduction of hydrofluosilicic acid, then recovering the hydrofluosilicic acid from the potassium salt thereof by the addition of an acid, distillation and absorption of the evolved gas in a spray of the potassium containing material, thus precipitating the potassium salt of the hydrofluosilicic acid, introducing sufficient additional hydrofluosilicic acid to compensate for loss thereof in the process, and then recovering the hydrofluosilicic acid from the precipitate in the same manner.

7. The process of recovering potassium compounds from distillery waste or slop which comprises spraying the latter into contact with vapors containing silicon tetrafluorid.

8. The process of obtaining potassium from distillery waste or slop comprising treating it with fluosilicic acid to form the potassium salt thereof, distilling the resulting sludge with a dilute non-volatile acid, reusing the distillate in the process by conducting it into the slop to reform fluosilicic acid, and collecting the potassium compound formed with the said acid.

9. The process which comprises precipitating potassium compounds from distillery waste or slop by the introduction of hydrofluosilicic acid and then recovering the hydrofluosilicic acid from the potassium salt thereof by the addition of an acid, distillation and absorption of the evolved gas in a quantity of distillery waste or slop.

10. The process which comprises precipitating potassium compounds from distillery waste or slop by the introduction of hydrofluosilicic acid and then recovering the hydrofluosilicic acid from the potassium salt thereof by the addition of an acid, distillation and absorption of the evolved gas in a spray of distillery waste or slop.

11. The process which comprises precipitating potassium compounds from distillery waste or slop by the introduction of hydrofluosilicic acid, then recovering the hydrofluosilicic acid from the potassium salt thereof by the addition of an acid, distillation and absorption of the evolved gas in a quantity of distillery waste or slop, thus precipitating the potassium salt of the hydrofluosilicic acid, and then recovering the hydrofluosilicic acid from the precipitate in the same manner.

12. The process which comprises precipitating potassium compounds from distillery waste or slop by the introduction of hydrofluosilicic acid, then recovering the hydrofluosilicic acid from the potassium salt thereof by the addition of an acid, distillation and absorption of the evolved gas in a spray of distillery waste or slop, thus precipitating the potassium salt of the hydrofluosilicic acid, and then recovering the hydrofluosilicic acid from the precipitate in the same manner.

13. The process which comprises precipitating potassium compounds from distillery waste or slop by the introduction of hydrofluosilicic acid, then recovering the hydrofluosilicic acid from the potassium salt thereof by the addition of an acid, distillation and absorption of the evolved gas in a quantity of distillery waste or slop, thus precipitating the potassium salt of the hydrofluosilicic acid, introducing sufficient additional hydrofluosilicic acid to compensate for loss thereof in the process, and then recovering the hydrofluosilicic acid from the precipitate in the same manner.

14. The process which comprises precipitating potassium compounds from distillery waste or slop by the introduction of hydrofluosilicic acid, then recovering the hydrofluosilicic acid from the potassium salt thereof by the addition of an acid, distillation and absorption of the evolved gas in a spray of distillery waste or slop, thus precipitating the potassium salt of the hydrofluosilicic acid, introducing sufficient additional hydrofluosilicic acid to compensate for loss thereof in the process, and then recovering the hydrofluosilicic acid from the precipitate in the same manner.

In testimony that I claim the foregoing I have hereunto set my hand.

MILTON C. WHITAKER.

Witnesses:
MINNIE ARMERDING,
G. R. TRAUTMAN.